US008165352B1

(12) United States Patent  (10) Patent No.: US 8,165,352 B1
Mohanty et al.  (45) Date of Patent: Apr. 24, 2012

(54) RECONSTRUCTION OF BIOMETRIC IMAGE TEMPLATES USING MATCH SCORES

(75) Inventors: Pranab Mohanty, Tampa, FL (US); Sudeep Sarkar, Tampa, FL (US); Rangachar Kasturi, Tampa, FL (US)

(73) Assignee: University of South Florida, Tampa, FL (US)

( * ) Notice: Subject to any disclaimer, the term of this patent is extended or adjusted under 35 U.S.C. 154(b) by 914 days.

(21) Appl. No.: 12/187,028

(22) Filed: Aug. 6, 2008

Related U.S. Application Data

(60) Provisional application No. 60/594,187, filed on Aug. 6, 2007.

(51) Int. Cl.
*G06K 9/00* (2006.01)
(52) U.S. Cl. ..................................... 382/115; 382/118
(58) Field of Classification Search .................. 382/115, 382/116, 117, 118, 305, 224, 226, 228; 340/5.53, 340/5.83
See application file for complete search history.

(56) References Cited

U.S. PATENT DOCUMENTS

| | | | |
|---|---|---|---|
| 5,781,650 A * | 7/1998 | Lobo et al. ..................... 382/118 |
| 6,035,055 A * | 3/2000 | Wang et al. .................... 382/118 |
| 6,292,575 B1 | 9/2001 | Bortolussi et al. |
| 6,301,370 B1 | 10/2001 | Steffens et al. |
| 6,556,196 B1 | 4/2003 | Blanz et al. |
| 6,681,032 B2 | 1/2004 | Bortolussi et al. |
| 6,853,739 B2 | 2/2005 | Kyle |
| 6,920,231 B1 | 7/2005 | Griffin |
| 7,054,468 B2 | 5/2006 | Yang |
| 7,127,087 B2 | 10/2006 | Huang et al. |
| 7,139,738 B2 | 11/2006 | Philomin et al. |
| 7,277,891 B2 * | 10/2007 | Howard et al. ............... 707/707 |
| 7,519,200 B2 * | 4/2009 | Gokturk et al. .............. 382/118 |
| 7,623,731 B2 * | 11/2009 | Lim et al. ...................... 382/277 |
| 7,716,157 B1 * | 5/2010 | Bourdev et al. ....................... 1/1 |
| 7,804,982 B2 * | 9/2010 | Howard et al. ............... 382/115 |
| 7,831,069 B2 * | 11/2010 | Shah et al. .................... 382/118 |
| 7,885,435 B2 * | 2/2011 | Shah et al. .................... 382/118 |
| 2006/0008150 A1 * | 1/2006 | Zhao et al. .................... 382/190 |

OTHER PUBLICATIONS

Mohanty, P.; Sarkar, S.; Kasturi, R.; , "Privacy & Security Issues Related to Match Scores," Computer Vision and Pattern Recognition Workshop, 2006. CVPRW '06. Conference on , vol. No. pp. 162, Jun. 17-22, 2006.*
Pranab Mohanty, Sudeep Sarkar, Rangachar Kasturi: A Non-Iterative Approach to Reconstruct Face Templates from Match Scores. ICPR (4) 2006: 598-601.*

(Continued)

*Primary Examiner* — Andrae S Allison
(74) *Attorney, Agent, or Firm* — Molly L. Sauter; Courtney M. Dunn; Smith & Hopen, P.A.

(57) ABSTRACT

A method of reconstructing biometric face image templates of a face recognition system (FRS) using the match scores or distances provided by the FRS. The match scores represent the distance between a image introduced to the FRS and the unknown image template stored in the FRS. The present method uses an affine transformation approximating the unknown algorithm within the FRS and the match scores provided by the FRS to determine the coordinates of the unknown target template. The coordinates of the unknown target template are then applied to a pseudo-inversion of the affine transformation to produce a reconstructed image template of the unknown target. This reconstructed image template can then be used to 'break-in' to the FRS.

9 Claims, 14 Drawing Sheets

OTHER PUBLICATIONS

Laurenz Wiskott, Jean-Marc Fellous, Norbert Kruger, Christoph Von Der Malsburg. "Face Recognition by Elastic Bunch Graph Matching." IEEE. Pattern Analysis and Machien Intelligence. Jul. 1997. vol. 19. No. 7. pp. 775-779.

Phillips, P.J.; Hyeonjoon Moon; Rizvi, S.A.; Rauss, P.J. "The FERET evaluation methodology for face-recognition algorithms." Pattern Analysis and Machine Intelligence. IEEE. Oct. 2000.vol. 22. No. 10. pp. 1090-1104.

Juwei Lu.; Plataniotis, K.N.; Venetsanopoulos, A.N. "Face recognition using LDA-based algorithms." Neural Networks. IEEE. Jan. 2003. vol. 14. No. 1. pp. 195-200.

Xiaofei He, Shuicheng Yan, Yuxiao Hu, Partha Niyogi, Hong-Jiang Zhang. "Face Recognition Using Laplacianfaces." Pattern Analysis and Machine Intelligence. IEEE. Mar. 2005. vol. 27. No. 3. pp. 328-340.

Chang, K.I.; Bowyer, K.W.; Flynn, P.J. "An Evaluation of Multimodal 2D and 3D Face Biometrics." IEEE. Analysis and Machine Intelligence.vol. 27. No. 4. Apr. 2005. pp. 619-624.

Shang-Hung Lin, Sun-Yuan Kung, Long-Ji Lin "Face Recognition/Detection by Probabilistic Decision-Based Neural Network." Neural Networks. IEEE. Jan. 1997. vol. 8. No. 1. pp. 114-132.

Kyong Chang, Kevin Bowyer, Sudeep Sarkar and Barnabas Victor. "Comparison and Combination of Ear and Face Images in Appearance-Based Biometrics." IEEE Transactions on Pattern Analysis and Machine Intelligence. Sep. 2003. vol. 25. No. 9. pp. 1160-1165.

Kotropoulos, C., Tefas, A., Pitas I. "Frontal Face Authentication Using Morphological Elastic Graphmatching." Image Processing. IEEE. Apr. 2000. vol. 9. No. 4. pp. 555-560.

Mohanty, P.K.; Sarkar, S.; Kasturi, R. "Designing Affine Transformations based Face Recognition Algorithms." Computer Vision and Pattern Recognition, 2005. IEEE. vol. No. 25. Jun. 25, 2005. pp. 173.

Pranab Mohanty, Sudeep Sarkar, Rangachar Kasturi. "From Scores to Face Templates: A Model-Based Approach." IEEE Transactions on Pattern Analysis and Machine Intelligence. vol. 29. No. 12. Dec. 2007.

\* cited by examiner

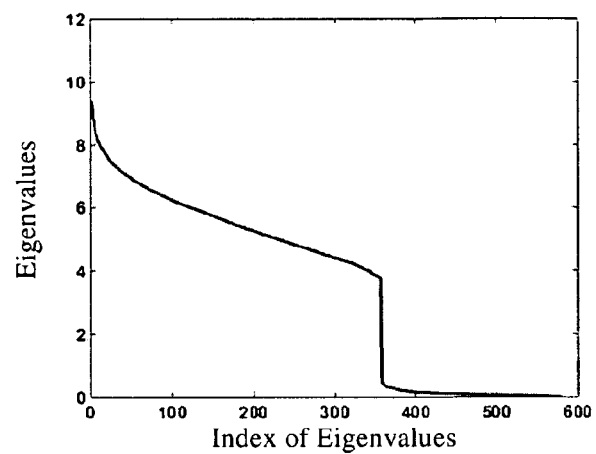
Figure 9A
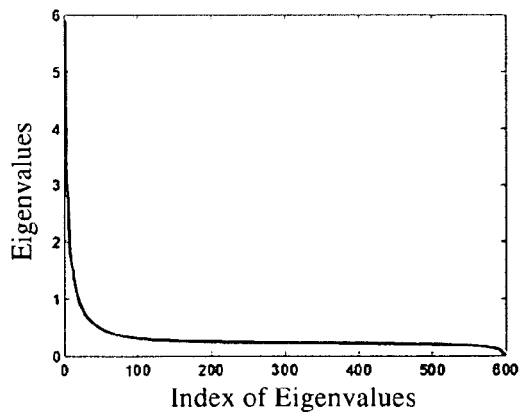 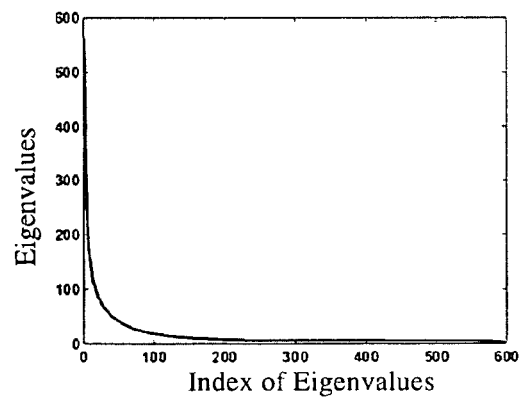
Figure 9B                              Figure 9C Baseline
  
Figure 10A  Figure 10B  Figure 10C
Bayesian
  
Figure 10D  Figure 10E  Figure 10F
Commercial
  
Figure 10G  Figure 10H  Figure 10I

RECONSTRUCTION OF BIOMETRIC IMAGE TEMPLATES USING MATCH SCORES

CROSS REFERENCE TO RELATED APPLICATIONS

This application is a non-provisional of co-pending U.S. Patent Application No. 60/594,187, entitled "From Scores to Face Templates; A Model Based Approach," filed Aug. 6, 2007, which is fully incorporated herein by reference.

STATEMENT OF GOVERNMENT INTEREST

This invention was made with Government support under U.S. Department of Defense Contract No. DCA20002D5014 awarded by the Dept. Homeland Security/CIA and Unisys Corp. The Government has certain rights in the invention.

FIELD OF INVENTION

This invention relates to biometric recognition systems; more specifically, a method of reconstructing image templates used by biometric recognition systems.

BACKGROUND OF THE INVENTION

Biometric technologies have become an integral part of many secure access systems. Biometric-based authentication systems are being deployed in both low-risk secure systems such as laptops and cell phones to relatively high-risk secure systems such as military bases and airports. The use of biometric technologies has a number of advantages over password or smartcard-based technologies, such as user convenience, high security, and less fraud. However, like many other authentication technologies, biometric-based systems are also vulnerable to security breaches. The cost of replacing a biometric token or template is higher to that of a password or a smart card, with severe security and privacy implications. The templates can be reused over digital networks or can be used to reproduce synthetic biometric templates such as fake fingers or model faces. In the case of face templates, there is an additional risk that the identity of a person using a biometric access system in a highly secure facility can be revealed. Several sources of security breaches in biometric-based authentication systems have been found. Some countermeasures have also been proposed to nullify such threats and the standardized biometric application programming interface (BioAPI) is continuously updated with countermeasure guidelines such as encrypting templates, avoiding storage and transmission of original templates, and performing quantization of match scores.

In general, most biometric authentication systems have four major modules, a biometric template acquisition sensor, a matching module to compare a new template to an enrolled template, a decision module using predefined thresholds for particular operational points, and a database for enrolled templates (template gallery). In many applications, it is not possible to integrate all these modules to one unit. In such scenarios, the information is passed from one unit to the other through digital channels and/or stored in digital media for offline processing. Each module possesses different levels of security threats, and different countermeasures are necessary to nullify such threats. For instance, 'aliveness' detection at the sensor unit will detect any attempts to hack the system with synthetic templates. Similarly, a secure database or a secure digital channel will prevent any unauthorized access to templates over a network. In applications, where the matching module and decision module are not integrated together, the 'match scores' must be stored in a digital media or transmitted through a digital channel to a decision module. Security breaches resulting from attacks on match scores can occur in distributed network cluster biometric systems with a central decision unit. Such networks are common in wide area monitoring contexts.

The dominant approach for a match score-based attack on a biometric system is based on hill climbing. C. Soutar was the first to propose an iterative template adaptation method, popularly known as the hill climbing attack, to break into a biometric system based on match scores. *Biometric System Security*, Secure, vol. 5, p. 46-49 (2002). As shown in FIG. 1, hill-climbing approach 1 attacks the account of a subject, referred to as the targeted subject, by starting from arbitrary face template 2 and iteratively refining 3 it. Face recognition system (FRS) 15 outputs match score 4, which is the distance between arbitrary face template 2 and target subject 41. At every iteration, if the modified template results in a better score than the previous match score 7, then the modified template is retained 9, or else, it is discarded and prior template 8 is modified again. The process is iterated until the template is accepted 6 as the targeted subject. With this method, a break-in may be achieved using a final template that does not look like any real face, as long as it deceives the system. In other words, it is not a face reconstruction method but just a break-in strategy.

One countermeasure for the first generation of hill climbing approaches is to quantize the match scores. In this approach, the FRS outputs match scores, but does not alter the match scores with small changes in input images. With appropriate quantization, it is not possible to get the incremental feedback needed by these approaches. Therefore, A. Adler developed a modified hill climbing attack for a face recognition system with quantized match scores using an additional independent set of eigenfaces. *Images Can Be Regenerated from Quantized Biometric Match Score Data*, Proc. Canadian Conf. Electrical and Computer Eng., p. 469-472 (May 2004). In Adler's modification, after initializing the process with an arbitrary face template, at every iteration, the previously updated template is multiplied with randomly selected eigenfaces having different weights. This generates templates farther away from the previous template. The face template that results in a better match score is retained as the updated image for the next iteration. The process terminates when there is no further improvement in match scores. Experimental results on a commercial face recognition algorithm show that after nearly 4,000 attempts, a high match score is achieved with 99% confidence. Later, Adler extended this idea to work with encrypted face templates. *Vulnerabilities in Biometric Encryption System*, Proc. Int'l Conf. Audio and Video-Based Biometric Person Authentication, p. 1100-1109 (July 2005).

Security breaches are possible not only in face biometrics but in other biometric applications also. U. Uludag and A. Jain extended the hill climbing approach to break into minutiae-based fingerprint recognition system. *Attacks on Biometric Systems: A Case Study in Fingerprints*, Proc. SPIE-EI 2004, Security, Steganography and Watermarking of Multimedia Contents, p. 622-633 (January 2004).

Although hill climbing-based attacks can successfully break a particular targeted account, effective countermeasures for such attacks can also be created. One property of hill climbing-based attacks is that they require a large number of attempts before success. Therefore, one possible countermeasure for such attacks is to restrict the number of consecutive, unsuccessful attempts. However, this still leaves the system vulnerable to a spyware-based attack that interlaces its false attempts with attempts by genuine users (successful attempts) and collects information to iterate over a period of time. However, in most hill climbing-based attacks, the templates at the ith attempt (iteration) are generated from the (i−1)th attempts (iterations) and are similar to each other. Therefore, if all unsuccessful attempts for a particular targeted account within a fixed time interval are monitored, a pattern of similar faces with decreasing dissimilarity scores will be found. Therefore, a continuous observation of unsuccessful match scores will help to detect hill climbing-based spyware attacks.

Recently, a method of modeling of a face recognition algorithm using an affine transform was developed. P. Mohanty, S. Sarkar, and R. Kasturi, *Designing Affine Transformations Based Face Recognition Algorithms*, Proc. IEEE Workshop Face Recognition Challenge (June 2005). Starting from distances computed by any face recognition algorithm, such as the Face Recognition Grand Challenge (FRGC) baseline algorithm, the modeling process calculates the best affine transform that approximates it. The modeling process is a closed-form solution based on classical Multidimensional Scaling (MDS).

Attempts to find vulnerabilities have focused on modifications of the hill-climbing technique; however, these techniques have become identifiable by recognition systems as attacks because of their iterative nature. Discovery of vulnerabilities in recognition systems, therefore, needs to be expanded beyond variations of the hill-climbing technique, in order for countermeasures to be designed to further prevent security breaches resulting from a recognition system's vulnerabilities. Although a process of modeling a face recognition algorithm is available, the process needs modification and improvement to better model a FRS and a method is needed to utilize the improved modeling process to identify vulnerabilities in recognition systems.

SUMMARY OF INVENTION

The present invention includes a non-iterative method of reconstructing unknown image templates of biometric systems using match scores. The method includes providing an array of known image templates, providing a recognition algorithm, wherein the recognition algorithm computes the distance between the unknown target template and an image template selected from the array of known image templates, providing an affine transformation approximating the recognition algorithm, and providing the coordinates of the known image templates in the approximation model.

The recognition algorithm may be known or unknown. The image templates in the array of known image templates are preferably distinct from one another. The image templates may be face image templates.

The method further includes finding unknown coordinates in the approximation model such that the distance between the unknown coordinates and the coordinates of known image templates equals the distances computed by recognition algorithm, calculating the pseudo-inversion of the affine transformation, and applying the unknown coordinates of unknown target template to the pseudo-inverted affine transformation.

The application of the unknown coordinates to the pseudo-inverted affine transformation results in a reconstruction of the unknown image template. Once this template has been reconstructed, it can be used to 'break in' to the recognition system, thereby exposing the system's vulnerability.

BRIEF DESCRIPTION OF THE DRAWINGS

For a fuller understanding of the nature and objects of the invention, reference should be made to the following detailed description, taken in connection with the accompanying drawings, in which:

FIGS. 9A-9C are a series of line graphs of the eigenvalues of the B matrix for the three face recognition algorithms: (A) baseline algorithm, (B) Bayesian algorithm, and (C) commercial algorithm. This distribution of eigenvalues provides an estimation of the dimension of the corresponding multidimensional scaling (MDS) space for each algorithm.

FIGS. 10A-10I are images of the top three dimensions of the affine approximation for the three face recognition algorithms: baseline algorithm (A-C), Bayesian algorithm (D-F), and commercial algorithm (G-I). The darker shades represent the variation captured along that particular dimension.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The present invention provides a method of reconstructing biometric image templates using the match scores of distinct images from a face recognition system (FRS). When the reconstruction method of the present invention 'breaks in' to a FRS, it creates no obvious patterns in the match scores, preventing detection by the FRS. Known countermeasures are not effective in preventing security breaches caused by the method, and new countermeasures will be difficult to design because of the absence of an obvious pattern in the match scores.

Figure 1:
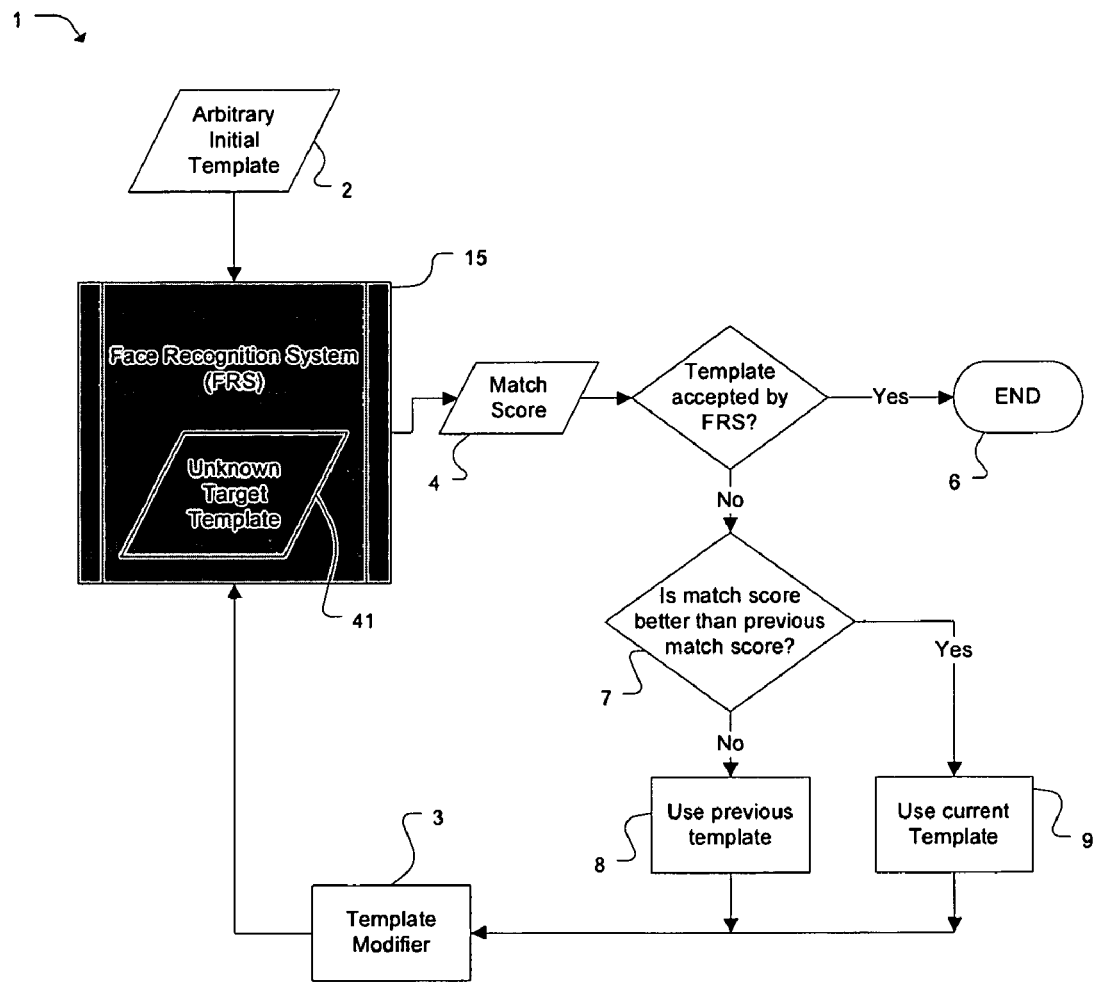
FIG. 1 is a block diagram of the hill climbing approach, a prior art method. The hill climbing attack is an iterative process that starts from a face template and then iteratively updates the template until the template is accepted by the system.
Figure 2:
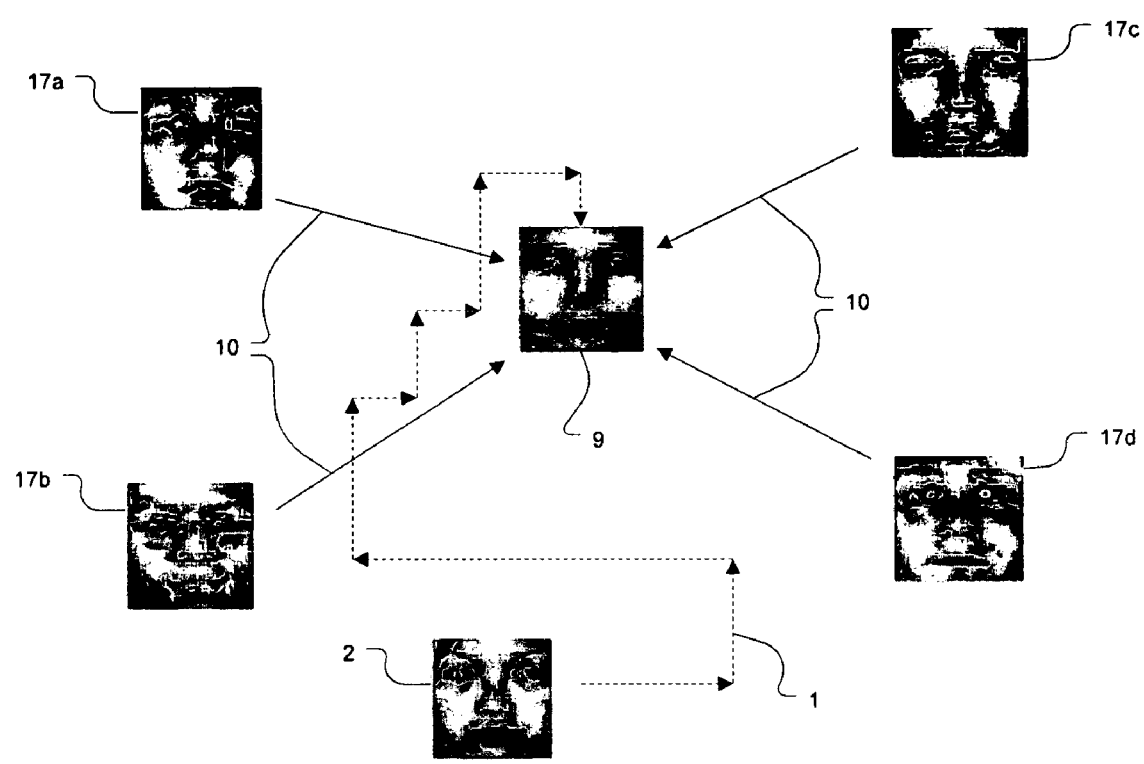
FIG. 2 is a visualization comparing the search process of a hill climbing attack and the present model-based method. The dotted line represents a possible path in a hill climbing attack starting from a chosen template. At each point on the path, the distance to the template is needed. The solid arrow represents a one-time comparison of templates of the targeted subject with members of the break-in set templates that is needed by the present method.

FIG. 2 is a schematic of the search process illustrating the differences between hill climbing attack 1 and reconstruction method 10 of the present invention. Reconstruction method 10 requires the distances, or match scores, between the image of the targeted subject 9 and a set of distinct images from the break-in set 17. Whereas a hill climbing-based attack computes scores for faces along a trajectory of incremental scores from an arbitrary template 2 to that of targeted subject 9. The statistically decreasing dissimilarity scores generated by a hill climbing-based approach can be used to detect such attacks, but such detection strategies cannot be applied to reconstruction method 10. Hill climbing attack 1 is a 'break-in' strategy to a FRS, whereas reconstruction method 10 is a template reconstruction scheme. In addition, attacks on an FRS are more feasible in real-time applications by reconstruction method 10, because the number of attempts is predefined by the number of images in the break-in set, instead of potentially unlimited, as in hill climbing attack 1.

Figure 3:
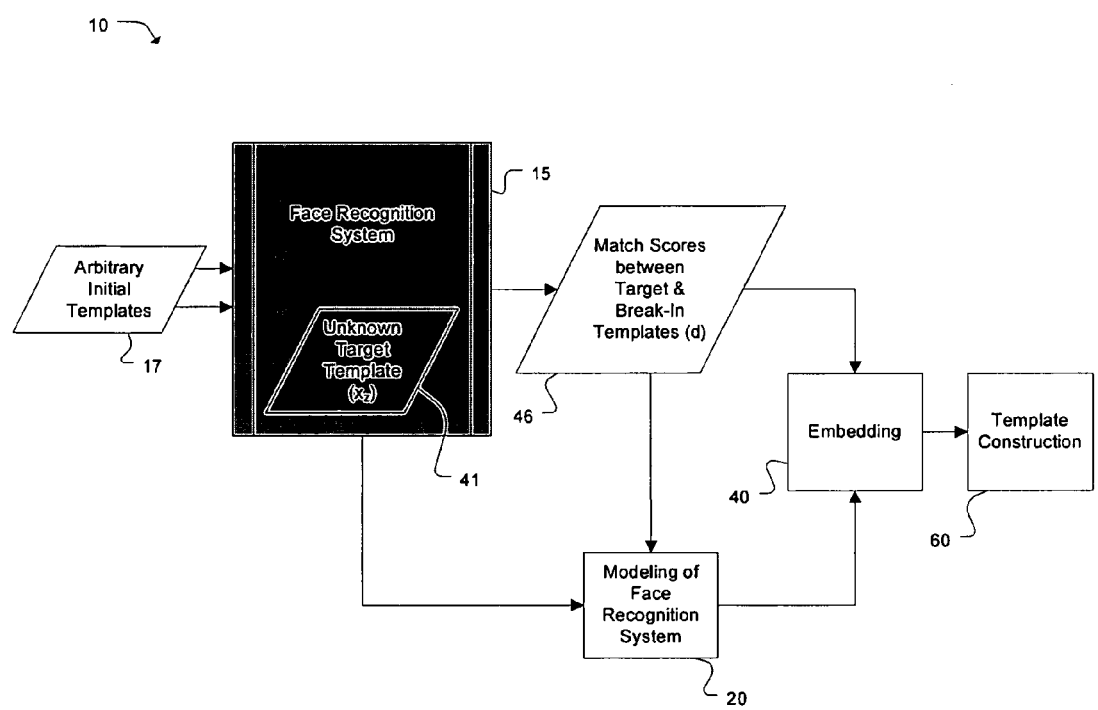
FIG. 3 is a simplified block diagram of the overall method of the present invention. The method is a non-iterative, model-based approach and employs multiple face templates—the break-in set.

A simplified diagram of reconstruction method 10 is shown in FIG. 3. A set of face images different from the gallery and probe sets is used as 'break-in' set 17. Modeling process 20 creates a model of FRS's 15 face recognition algorithm. FRS 15 is treated as a complete black box and no reverse engineering is performed on it. Instead, an assumption is made as to the type of face recognition algorithm used by FRS 15. It may be possible to identify the recognition algorithm given score matrices of known algorithms, but this is not necessary for the success of the present method.

Modeling process 20 is an offline procedure and needs to be constructed only once for a given recognition algorithm. Once the model is built, templates are presented from break-in set 17 to FRS 15, which calculates match scores 46 to unknown target template 41. Unknown target template 41 represents an enrolled template in the FRS, which when reconstructed results in a successful 'break-in'. Embedding process 40 then uses match scores 46 to embed unknown target template 41 in the model. Finally, template construction process 60 manipulates the model to construct unknown target template 41.

Modeling Process

Figure 4:
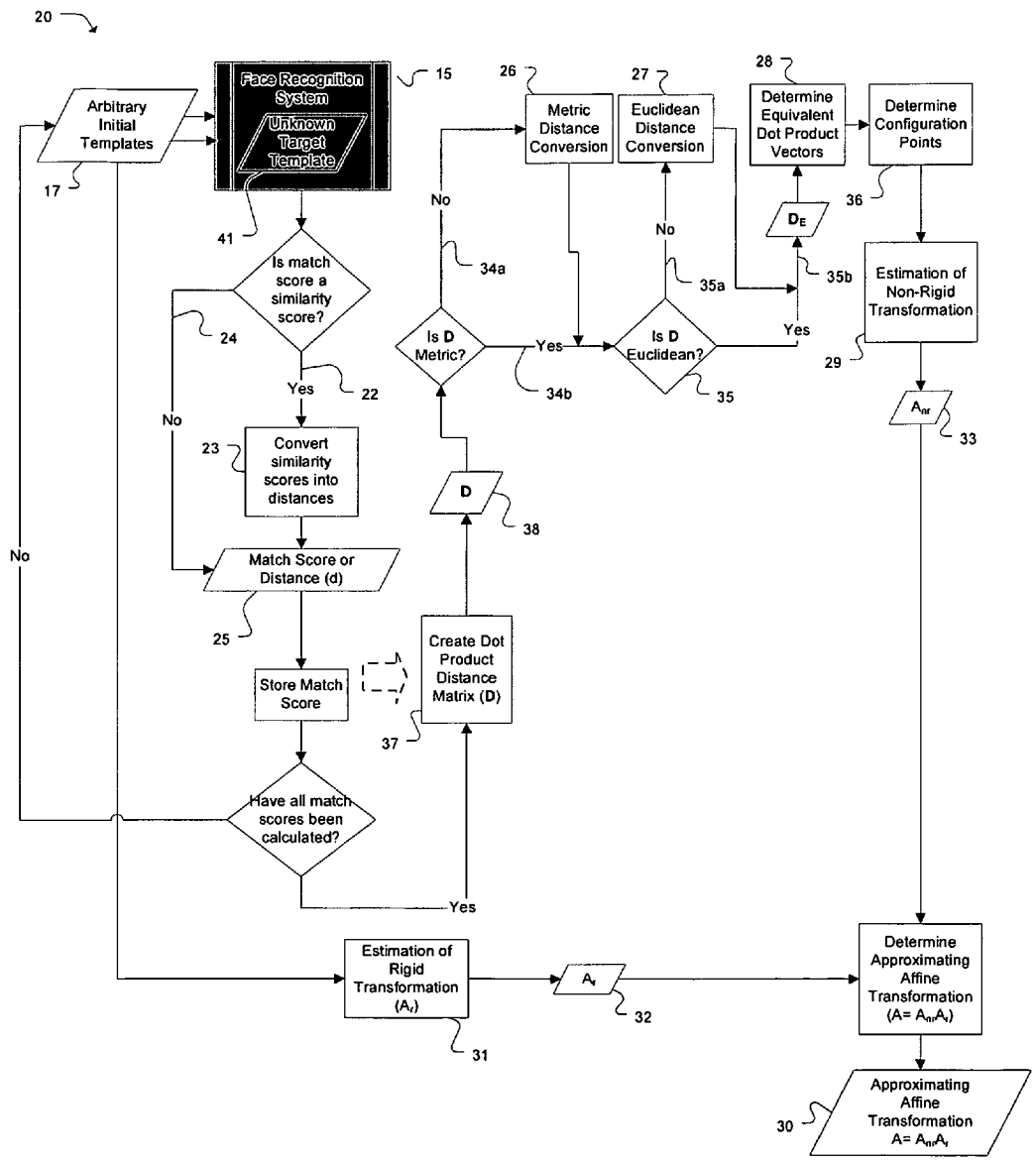
FIG. 4 is a block diagram of the modeling process of the present invention. Starting with a set of face templates (break-in set), a rigid and a nonrigid transformation is estimated that approximates the behavior of the recognition algorithm of the face recognition system in terms of distance measure on these templates.

Modeling process 20, illustrated in FIG. 4, is used to model the face recognition algorithm of FRS 15 using approximating affine transformation 30. The inversion of this transformation is then used by embedding process 40 and template construction process 60 to reconstruct unknown target template 41. The inputs to FRS 15 are two distinct face templates $x_i$ and $x_j$ selected from break-in set 17 and the output is a match score or distance d 25 between the two templates.

Typically, a face recognition algorithm of an FRS transforms the given image into a point in a low-dimensional space and then performs a distance measure on this model space. This low-dimensional space is usually constructed by statistical methods such as PCA, linear discriminant analysis (LDA), or independent component analysis (ICA) or constructed out of low-level features detected in the images, such as in the elastic bunch graph matching approach.

The face recognition algorithm of FRS 15 is unknown to modeling process 20. Modeling process 20 models a face recognition algorithm, even feature-based ones, by an affine transformation. Modeling process 20 finds approximating affine transformation 30 by combining orthogonal (or rigid) transformation 32 and nonrigid (shear and stretch) transformation 33 transformation. Nonrigid portion 33 of transformation 30 enhances performance of modeling process 20. Approximating affine transformation 30 preserves distances 25 among templates 17 generated by FRS 15. Any template can be embedded in space 30 based on its distance d 25 from a known set of templates, break-in set 17.

Modeling process 20 must determine approximating affine transformation A 30 such that when given images $x_i$'s, are transformed to affine space 30, the euclidean distance between the transformed coordinates of the images are similar to the distances computed by FRS 15. In this notation, $x_i$'s are N-dimensional row-scanned representations of the images, and affine transformation A 30 has dimensions M×N, with M<N.

To find approximating affine transformation 30, the given distances (or their monotonically increasing transformation) are expressed between known images (images contained in break-in set 17) as a dot product distance between vectors 28 and then, affine transformation 30 is constructed between these vectors and the images.

(Herein, matrices are denoted by bold capital letters A and column vectors by bold small letters a. The identity matrix is denoted by I, a vector of ones by 1, a vector of zeros by 0, and the transpose of A by $A^T$.)

Modeling Process: Dot Product Distance

To determine dot product distances between vectors 28, dot product distance matrix D 38, must first be created 37. To create 37 the dot product distance matrix D 38, $d_{ij}$, represents the distance between two image templates of break in set 17 $x_i$ and $x_j$, ($x_i^T \in \mathfrak{R}^N$) as computed by FRS 15. The distances $d_{ij}$ are arranged as a K×K matrix D=$[d_{ij}^2]$, where K is the number of images in break-in set 17.

This process assumes that FRS 15 outputs dissimilarity scores 24 of the two templates. However, if FRS 15 computes similarities 22, the similarity scores $s_{ij}$ can be converted 23 into distances using a variety of transformations, such as $(1-s_{ij})$, $-\log(s_{ij})$, and $$\frac{1}{s_{ij}} - 1.$$

Modeling Process: Metric Distance Conversion

For some recognition algorithms, the observed dissimilarity matrix D 38 may not exhibit metric properties 34a. In such cases, distance matrix D 38 must undergo metric distance conversion 26. A distance measure d is called a metric if it satisfies the following properties:

1. d(x, y)=0 iff x=y (reflexive).
2. d(x, y)≧0 ∀x≠y (positivity).
3. d(x, y)=d(y, x) (symmetry).
4. d(x, y)≦d(x, z)+d(z, y) (triangle inequality).

First, examine each of the metric properties more closely on D. Two different templates with little variation always produce a nonzero dissimilarity. Therefore, it can be assumed that the reflexive and positivity properties always hold unless small scores are forcefully suppressed to zero. Even if the scores are rounded off to the nearest number or small scores are suppressed to zero, as long as there is not a sparse distance matrix with few positive entries, an embedding in the model space can be found that can approximate the distance matrix D.

Second, if the distance matrix D violates the symmetric property, then this property can be reinstated by replacing D with $\frac{1}{2}(D+D^T)$.

Finally, if D violates the triangle inequality, then the triangle inequality can be enforced by adding a constant factor $\zeta$ to non-diagonal entries of D, where $\zeta \geq \max_{i,j,k}|d_{ij}+d_{jk}-d_{jk}|$. The value of $\zeta$ is learned using break-in set 17 templates only. Using an offline copy of FRS 15, the pair-wise distance between every template of break-in set 17 is computed, resulting in a full distance matrix D with diagonal elements representing self-distance that is set to zero. The learned value of $\zeta$ is used in computing the distance from the targeted subject to each template in break-in set 17. $\zeta$ is added to the non-diagonal entries of D irrespective of genuine and impostor scores; therefore, the overall performance of FRS 15, as represented by the distance matrix, is not affected by the addition of $\zeta$ to the computed distances. Once matrix D 34 is metric, it must be determined if matrix D 34 is euclidean 35.

Modeling Process: Euclidean Distance Conversion

In many cases, the distance measure may not be euclidean 35a. Then distance matrix D 34 must be transformed 27 to the equivalent euclidean distance matrix. Although the process of converting 27 a noneuclidean distance matrix to an equivalent euclidean distance matrix is not feasible in all cases, an approximation to noneuclidean distance matrix D 34 can be used. Before conversion 27 to a euclidean distance matrix can be achieved, matrix D 34 must consist of distances that are metric 34b.

The procedure for conversion 27 of noneuclidean distance matrix (D) to a euclidean distance matrix ($D_E$) was adapted from E. Pekalska, P. Paclik, and R. Duin. *A Generalized Kernel Approach to Dissimilarity-Based Classification*, J. Machine Learning Research, vol. 2, no. 2, pp. 175-211 (2002). A distance matrix D 34 is euclidean 35b if and only if $$B = \frac{1}{2}HD_EH$$

is a positive semi-definite metric.

A euclidean distance matrix can be determined by finding a constant h such that $h \geq -2\lambda_n$ is the smallest (negative) eigenvalue of HDH, where $$H = \left(I - \frac{1}{K}11^T\right)$$

and using it to modify the original distance matrix according to the formula $$(d_{ij}^2 + h)^{\frac{1}{2}}, i \neq j.$$

Once a metric 34b and euclidean 35b distance matrix is established, the configuration points can be determined 34.

Modeling Process: Determine Configuration Points

For each image, vectors $y^i$ must be found such that $y_i^T y_j = f(d_{ij})$, where f( ) is a monotonically increasing function, and $y_i^T \in \Re$. For biometric systems, if the original match score between two templates is not modified based on other templates on the gallery, then a monotonically increasing transformation of the distances does not affect the model of the system. The choice of this monotonically increasing function depends on the face recognition algorithm under consideration.

Here, metric multidimensional scaling (MDS) is used to determine 36 a set of configuration points that preserve the pair-wise distances given by a distance matrix. Given the euclidean distance matrix $D_E$, K vectors $\{y_1, \ldots y_k\}$ must be found, such that $D_E(i, j) = (y_i - y_j)^T (y_i - y_j)$. ("Equation (1)"). The configuration points $y_i$'s are not unique. Any translation or rotation of vectors $y_i$'s can also be a solution. To reduce such degrees of freedom of the solution set, the solution set is centered at the origin and the sum of the vectors is constrained to zero, that is, $\Sigma_i y_i = 0$.

Equation (1) can be compactly represented in matrix form as $D_E = c \cdot 1^T + 1 \cdot c^T - 2Y^T Y$ ("Equation (2)"), where Y is a matrix constructed using the vectors $y_i$'s as the columns $Y = \{y_1, \ldots y_k\}$, and c is a column vector of the magnitudes of the vectors $y_i$'s. Thus, $c = [y_1^T y_1, \ldots, y_K^T y_K]^T$ ("Equation (3)"). Equation 2 is then pre and post multiplied on each side of the equation by centering matrix $$H = \left(I - \frac{1}{K}11^T\right),$$

resulting in $HD_E H = Hc \cdot 1^T H + H1 \cdot c^T H - 2HY^T YH = -2Y^T Y$ ("Equation (4)"), the constraint is found for the centered solution set, that is, $\Sigma_i y_i = 0$ and $HY^T = Y^T$. Using B to represent $-\frac{1}{2}HD_E H$, the search for the coordinates can be cast as $B = -\frac{1}{2}HD_E H = Y^T Y$ ("Equation 5"). Because $D_E$ is a euclidean matrix, matrix B is also a distance matrix, representing dot product distances between the vectors $y_i$'s and is a symmetric positive semi-definite matrix.

Modeling Process: Determining Equivalent Dot Product Vectors

Next, a set of coordinate vectors Y must be found 28 such that the euclidean distance between these coordinates is related to the distances computed by the FRS 15 by an additive constant. Therefore, a set of coordinate vectors Y, must be found such that $Y^T Y = B$, where B is the dot product distances derived from the monotonically increasing transformation of the distances computed by FRS 15. To find 28 the set of coordinate vectors Y, the eigenvalue decomposition (EVD) of B can be used. Because B is a symmetric positive semi-definite matrix, it can be assumed that the rank of B is $M \leq N$, so B has M nonnegative eigenvalues and N–M zero eigenvalues. Therefore, $B = V_{EVD} \Delta_{EVD} V_{EVD}^T$ ("Equation (6)"), where $\Delta_{EVD}$ is N×N diagonal matrices where the first M diagonal entries represents the nonzero eigenvalues of matrix B sorted in ascending order. $V_{EVD}$ represents the corresponding eigenvectors of B. The solution is then given by $$Y = \left( V_{EVD}^M \Delta_{EVD}^{M \frac{1}{2}} \right)^T \quad \text{("Equation (7)")}$$

28, where $\Delta_{EVD}^M$ is M×M diagonal matrices consisting of M nonzero eigenvalues of B, and $V_{EVD}^M$ represents the corresponding eigenvectors of B.

Modeling Process: Determining the Approximating Affine Transformation

Approximating affine transformation A 30 must relate coordinates Y to the images X such that $Y = A(X - \mu)$, ("Equation (8)") where $\mu$ is the mean of the images in break-in set 17.

Transformation 30 is not restricted to be orthonormal or rigid. Instead, approximating affine transformation A 30 is composed of two subtransformations: non-rigid transformation $A_{nr}$ 33 and rigid transformation $A_r$ 32, that is, $A = A_{nr} A_r$.

Rigid transformation $A_r$ 32 can be arrived at by any analysis 31 that computes an orthonormal subspace from break-in set 17. PCA was used here for the rigid transformation. The PCA coordinates corresponding to the nonzero eigenvalues is denoted by $X_r = A_r(X - \mu)$.

Non-rigid transformation $A_{nr}$ 33 is estimated 29 by relating these rigid coordinates $X_r$ to the distance-based coordinates Y: $Y = A_{nr} X_r$ ("Equation (9)"). Substituting equation (7) in equation (9), gives $$A_{nr} X_r = \left( V_{EVD}^M \Delta_{EVD}^{M \frac{1}{2}} \right)^T. \quad \text{("Equation (10)")}$$

Multiplying both sides of Equation (10) by $X_r^T$ and using the result that $X_r X_r^T = \Lambda_{PCA}$, where $\Lambda_{PCA}$ is the diagonal matrix with the nonzero eigenvalues computed by PCA, gives $$A_{nr} = \left( V_{EVD}^M \Delta_{EVD}^{M \frac{1}{2}} \right)^T X_r^T \Lambda_{PCA}^{-1}. \quad \text{("Equation (11)")}$$

Non-rigid transformation 33, allowing for shear and stress, and rigid transformation 32 together model the face recognition algorithm. Rigid transformation 32 is not dependent on the face recognition algorithm; only non-rigid part 33 is determined by distances 25 computed by FRS 15.

Embedding Process

Figure 5:
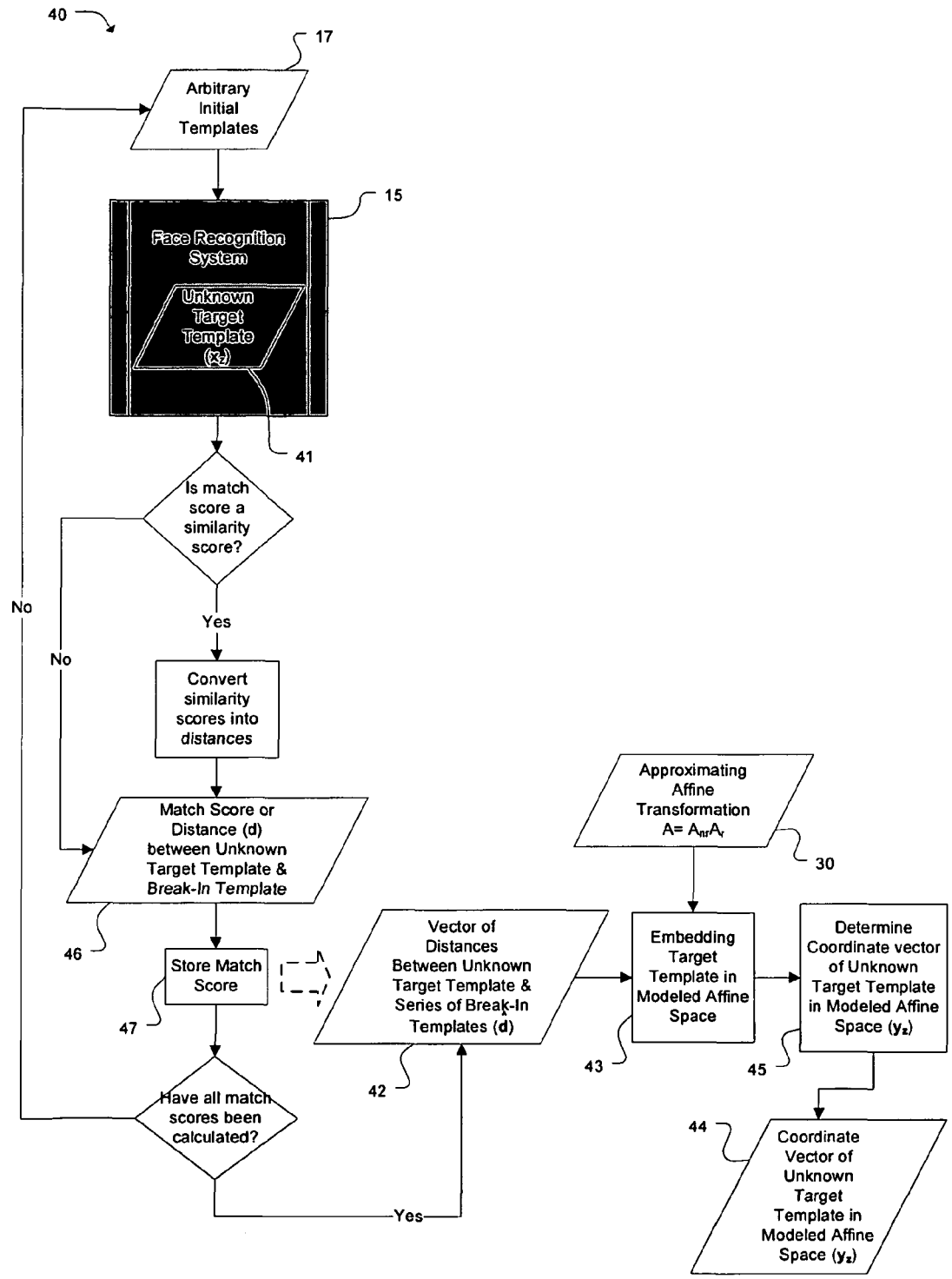
FIG. 5 is a block diagram of the embedding process of the present invention. After estimating the affine transformation A, the distance between a template of the targeted subject and selected break-in set templates is used to compute the coordinate of the targeted subject in lower dimensional space.

Once modeling method 20 determines approximating affine transformation 30, embedding process 40, as illustrated in FIG. 5, must embed 43 unknown target template 41 in modeled affine transformation space 30. Once unknown target template 41 has been embedded 43, coordinates 44 of unknown targeted template 41 can be determined 45.

Embedding process 40 does not have or need access to unknown target template 41; however, distances 46 of unknown target template 41 to any given image in break-in set 17 are needed. FRS 15 takes a template from break-in set 17, compares it to stored unknown target template 41 and outputs match score 46. Match score 46 is stored 47 in distance vector $\hat{d}$ 42, creating $\hat{d} = [\hat{d}_1, \hat{d}_2, \ldots, \hat{d}_K]^T$. This process is repeated until a sufficient number of distances between break-in templates 17 and unknown target template 41 are calculated and stored in distance vector d 42. If $y_z$ represents coordinate vector 44 of unknown target template 41 embedded in affine space 30 and $Y = [y_1, \ldots, y_K]$ represents a matrix of coordinate vectors of K image templates from break-in set 17, then, based on the nature of the modeled affine transformation 30 and taking into account the euclidean correction factor found in modeling process 20, distances in distance vector $\hat{d}$ 42, would be equal to the euclidean distances between unknown target template's coordinate vector $y_z$ 44 and the corresponding break-in set 17 template's coordinate vector $y_i$.

Mathematically, if unknown target template's 41 coordinate vector $y_z$ 44 is unknown, $\hat{d}_i^2 = \|y_i - y_z\|^2 = \|y_i\|^2 + \|y_z\|^2 - 2y_i^T y_z$, $\forall i = 1, \ldots, K$ ("Equation (12)"). Subtracting $\hat{d}_i^2$ from $\hat{d}_{(i+1)}^2$ and simplifying, results in $E y_z = F$, $y_z = E^{554} F$ ("Equation (13)"), where $E^T = [(y_2 - y_1)^T, (y_3 - y_2)^T, \ldots, (y_K - y_{K-1})^T]$, ("Equation (14)") and $F^T = [f_i]$, $f_i = \frac{1}{2}[(\hat{d}_i^2 - \|y_i\|^2) - (\hat{d}_{i+1}^2 - \|y_{i+1}\|^2)]$, ("Equation (15)") and $E^{\dagger}$ represents the pseudoinverse of E. Here, it assumed that E does not map all points to the null space of F; therefore, the pseudoinverse of E exists.

Because, E consists of all projected points $y_i$'s in the model space, a very low rank of E, such as, two or three, indicates that either the face recognition algorithm computes the distance between two templates in such low-dimensional space, or the templates in break-in set 17 are similar to each other and, therefore, lying in a subspace of dimension two or three. The later can be avoided by selecting distinct templates in break-in set 17; however, if the recognition algorithm projects the templates to two or three-dimensional spaces, then the performance of the system will have a low False Acceptance Rate (FAR), and any arbitrary template has a high probability of breaking into FRS 15.

Given distances $\hat{d} = [\hat{d}_1, \hat{d}_2, \ldots, \hat{d}_K]$ 42 of unknown target template's coordinate vector $y_z$ 44 from coordinate vectors $y_i$ of K images in break-in set 17, Equation (13) can be used to compute coordinates of $y_z$ 44 in approximating affine space 30.

Template Construction Process

Figure 6:
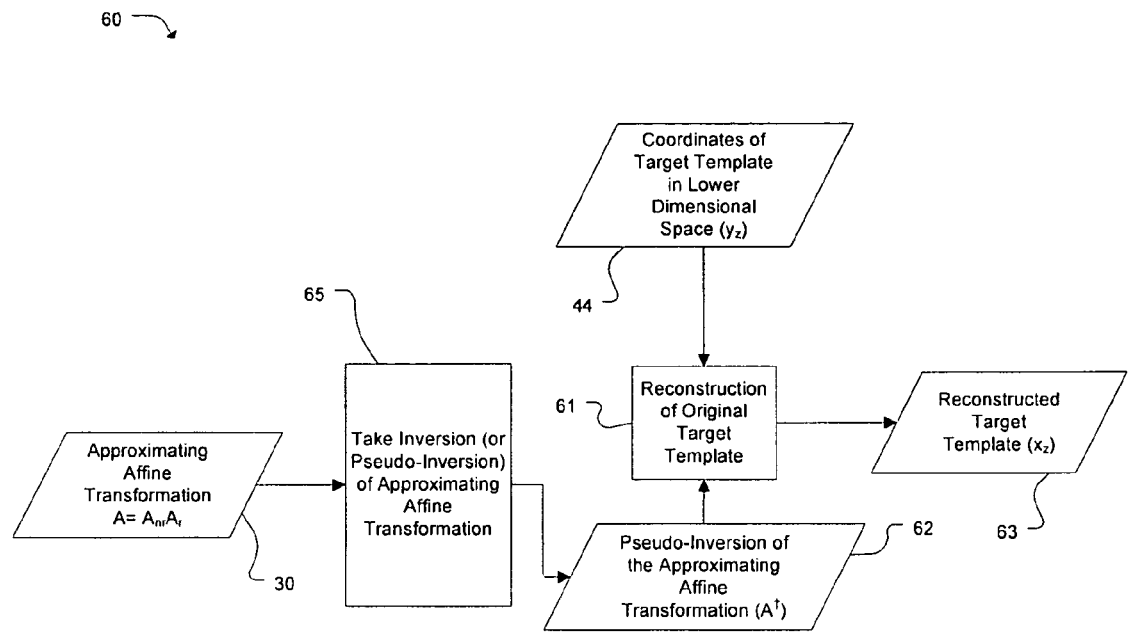
FIG. 6 is a block diagram of the template construction process. Once the coordinates of the targeted subject in the lower dimensional space are known, the pseudo-inversion of the affine transformation is used to reconstruct the original template of the targeted subject.

Once coordinate vector $y_z$ 44 of unknown target template 41 in affine space 30 is obtained, template construction process 60 rebuilds unknown target template 41, as shown in FIG. 6. Affine space 30 is inverted (or pseudo-inverted) 65 and then the vector coordinates of to construct the template. Mathematically, if $y_z$ is the embedded coordinate of unknown template $x_z$, then $A_{nr} A_r x_z = y_z$. Solving for the unknown target template $x_z$ 41 yields $x_z = A_r^T A_{nr}^{\dagger} y_z$ ("Equation (16)").

Figure 7:
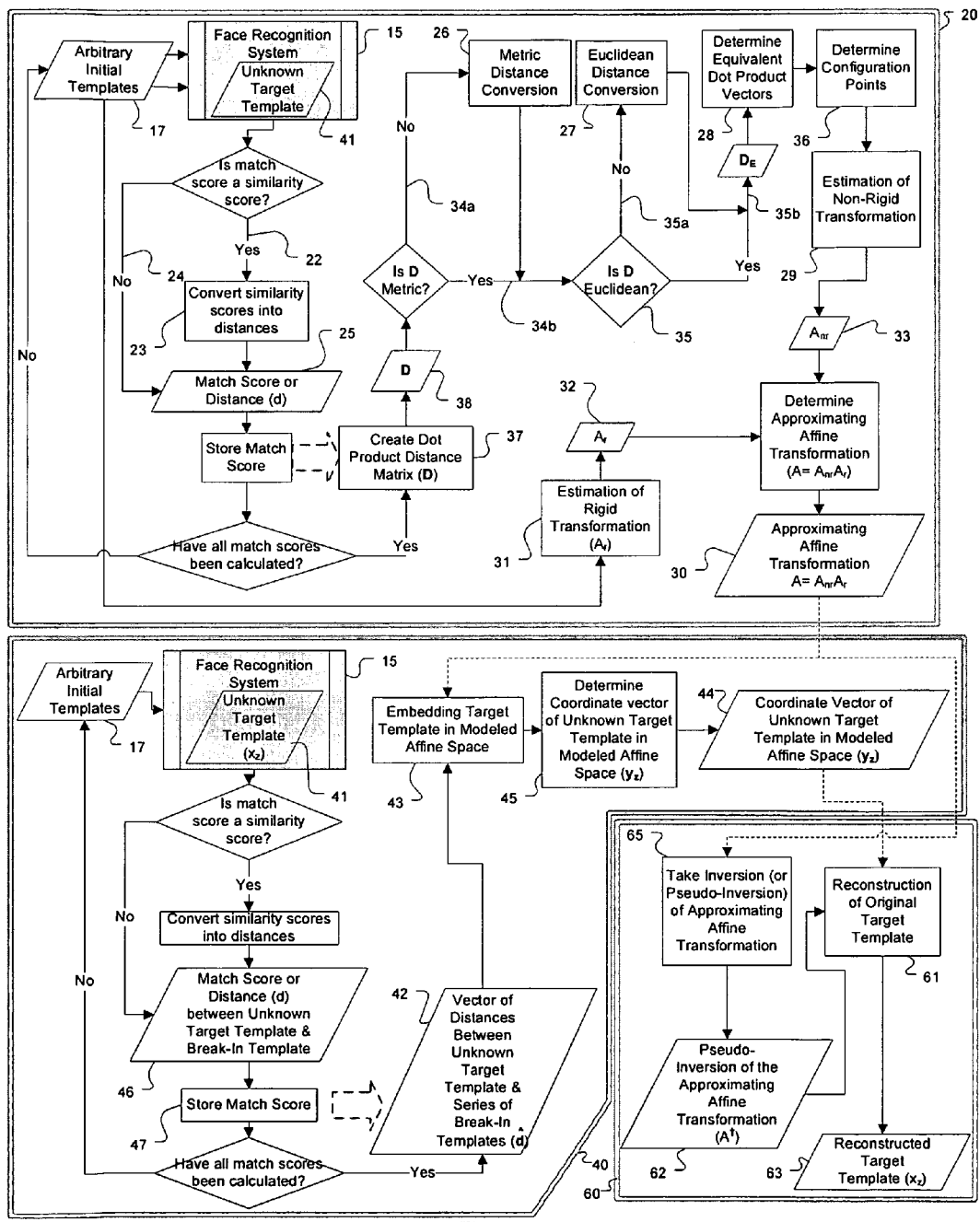
FIG. 7 is a detailed block diagram of the overall method of the present invention integrating the modeling, embedding, and template construction processes.

A detailed diagram of the overall method of the present invention including modeling process 20, embedding process 40, and template construction process 60 is shown in FIG. 7.

Validation

The reconstruction method was tested using three fundamentally different face recognition algorithms: PCA with the Mahalanobis cosine distance measure, the Bayesian intra-extrapersonal classifier (BIC), and a feature-based commercial algorithm.

Figure 8A:
FIGS. 8A-8B are a series of sample images from (A) the break-in set and (B) the gallery set. The gallery set and the break-in set are independent of each other and have no subjects in common.
Figure 8B:

The face images were selected from the FERET and FRGC face databases. To ensure the distinctiveness of the break-in face set with the gallery set, the break-in set was chosen from a subset of the FRGC training set and all the images from the FERET gallery set, containing 1,196 images from 1,196 subjects, were reconstructed. The FERET face database is a widely used public database, and the gallery set is predefined in that database. The Colorado State University (CSU) Face Identification Evaluation System was used to normalize the original face images. The normalized face images have the same eye locations, the same size (150×130), and similar intensity distribution. FIG. 8 shows some of the preprocessed face images for the break-in set (FIG. 8A) and the gallery set (FIG. 8B). For break-in sets, a subset of the FRGC training set was selected with 600 controlled images from the first 150 subjects (in the increasing order of their numeric ID) with four images per subject. In order to validate the effectiveness of the reconstruction method and break-in strategy, the selected face recognition algorithms must have high recognition rates at low FAR. Because most of the face recognition algorithms perform poorly on a data set with one or more variations in face images, the experiments were restricted to controlled frontal face images only. Similarly, current template-based algorithms require the images to be scaled to the same size with the same eye location, so a preprocessing step is inevitable for such algorithms.

However, if a face recognition system has high performance without such restriction on the variation of face images or size of the face images, then the reconstruction method can be extended naturally to such systems.

The reconstruction method was evaluated on two template-based algorithms and one feature-based face recognition system: 1) PCA approach with Mahalanobis cosine angle as the distance measure, 2) Moghaddam and Pentland's algorithm, popularly known as the Bayesian intrapersonal/extrapersonal classifier, and 3) a commercial face recognition system based on a Local Feature Analysis of face images. Both the baseline and Bayesian algorithms were trained using the break-in set from the FRGC training set. The commercial algorithm did not require any training process and was used as a black box in all experiments. Because all of the face images are normalized with fixed eye coordinates ( ) and fixed-size (150×130) face images, the face and eye detector module embedded in the commercial face recognition system was not utilized. Using the fafb probe set of the FERET distribution, the baseline, the Bayesian, and the commercial algorithms had 97 percent, 95 percent, and 99 percent True Acceptance Rate (TAR) at 1 percent FAR, respectively.

The three algorithms have different approaches to comparing two faces and generate similarity and/or dissimilarity scores with different distance measures. The baseline algorithm uses a Mahalanobis cosine angle and has dissimilarity scores between −1 and 1. Similarly, the Bayesian maximum likelihood classifier reports the similarity between two faces in terms of probability of difference image to the intrapersonal/extrapersonal space. For this experiment, the CSU implementation of the Bayesian algorithm was used, where a negative logarithm transformation is applied to the probabilistic similarity score to convert the score into a distance measure. However, in order to have an upper bound for the dissimilarity scores, the distances to the interval [0,1] was row normalized. The similarity measure used in the feature-based commercial algorithm is not known, but the similarity scores are within a finite range of $[S_{min}\ S_{max}]$. The similarity scores were converted to distances by simply subtracting each match score $S_{ij}$ from the maximum possible match score $(S_{min}-S_{max})$. In the experiments, raw match scores from the commercial system were used without any score normalization. All three distance measures used by respective algorithms exhibit the symmetric property but violate the triangle inequality property. Therefore, the triangle inequality property was reinforced in the respective distance matrices. The values of $\zeta$ learned from the break-in set were 1.297, 2.094, and 19.970 for the baseline, the Bayesian, and the commercial algorithms, respectively.

The next objective was to model the behavior of each face recognition algorithm in terms of an affine transformation. The distance between two templates computed by these algorithms should be close to the euclidean distance between the two templates in the respective affine spaces. Some of the intermediate results show the accuracy of the reconstruction method and the behavior of the constructed affine spaces.

The graphs shown in FIG. 9 plot the eigenvalues of the transformed distance matrices B defined in Equation (5) for the baseline algorithm (FIG. 9A), the Bayesian algorithm (FIG. 9B), and the commercial algorithm (FIG. 9C). The eigenvalues of the individual algorithms reflect the nature of the affine space for each individual algorithm. The plots appear different due to different scales of eigenvalues for each algorithm. FIG. 9A shows that the eigenvalues drop from 9.4 to zero at 360 index of the eigenvector, which is about 60 percent of the total number of images. Therefore, the baseline algorithm uses top eigenvectors that contribute 60 percent of the total energy. FIG. 9 also provides estimation for the dimension of each affine space. For example, it is expected that for the baseline algorithm, any break-in set with more than 360 images will result in approximately the same probability of break-in.

However, in for the Bayesian algorithm, eigenvalues did not drop to zero even with 600 images in the break-in set. Therefore, the loss of sharp features is expected in the reconstructed images for the Bayesian algorithm with 600 or less images in the break-in set. Similarly, for the commercial algorithm, a near optimal performance with 600 images in the break-in set is expected.

FIG. 10 represents the top three dimensions of the affine approximation of the three face recognition algorithms. These dimensions indicate the amount of variations (darker shades) captured by the affine transformation along the corresponding dimensions. Although individual dimensions of the affine transformation for each algorithm differ, a collective observation at the top three dimensions reveals that each algorithm tries to capture a similar variation in face images in the first three dimensions of the respective affine transformation. For example, the second dimension of affine transformation of the commercial algorithm (FIG. 10h) is similar to the third dimension of affine transformation of the Bayesian algorithm (FIG. 10f). Similarly, the first dimension of affine transformation for the baseline algorithm (FIG. 10a) captures similar variations as that of the second dimension of affine transformation for the Bayesian algorithm (FIG. 10e). To quantify the modeling error, the euclidean distance between the projected images in the affine space is computed and compared with the actual distance matrices computed by the respective algorithms after the correction of the additive constant factor. The normalized error ϵ is then computed as $$\varepsilon = \frac{\tilde{d}_{ij} - d_{ij}}{d_{ij}},$$

where $\tilde{d}_{ij}$ represents the euclidean distance between projected images i and j in the affine space, and $d_{ij}$ represents the actual distance computed by the recognition algorithm. The mean of the normalized errors ϵ are 0.002, 0.0457, and 0.1881 with standard deviations of 0.1563, 0.0915, and 0.2554 for the baseline, Bayesian, and commercial algorithms, respectively.

Figure 11:
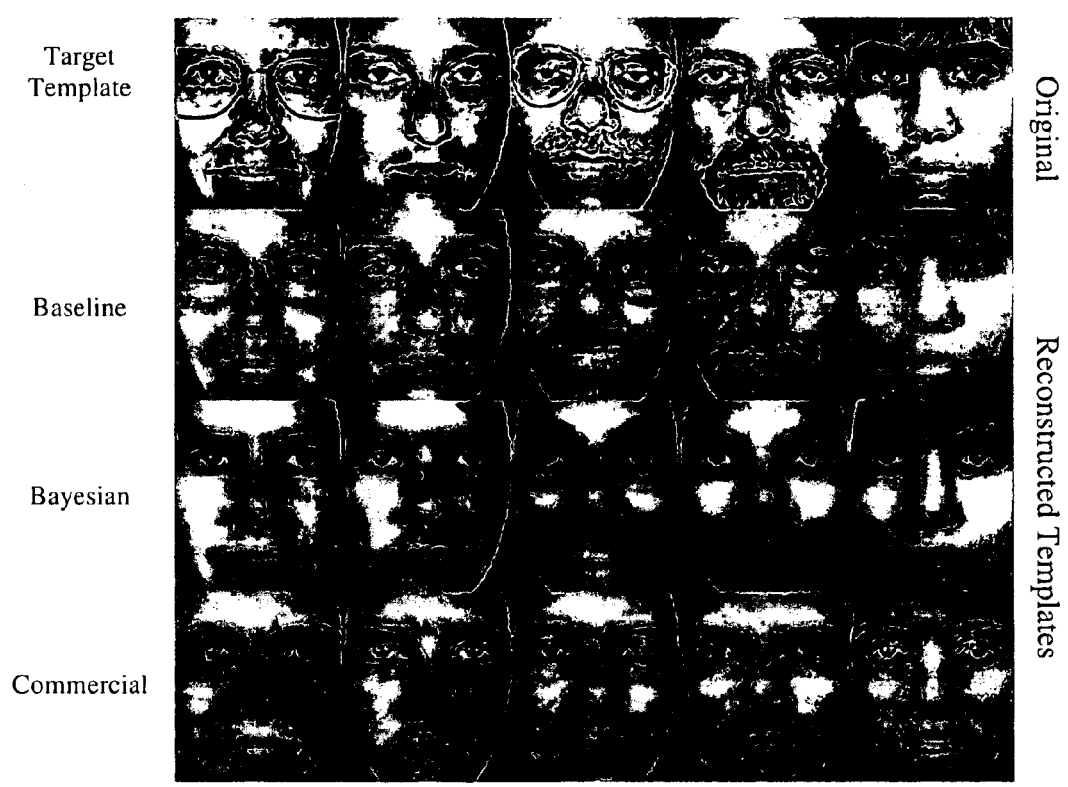
FIG. 11 is a series of reconstructed face templates using a break-in set with 600 images: the first row represents the original templates; the second, third, and fourth rows represent the reconstructed templates for the baseline, Bayesian, and commercial algorithms, respectively.
Figure 12:
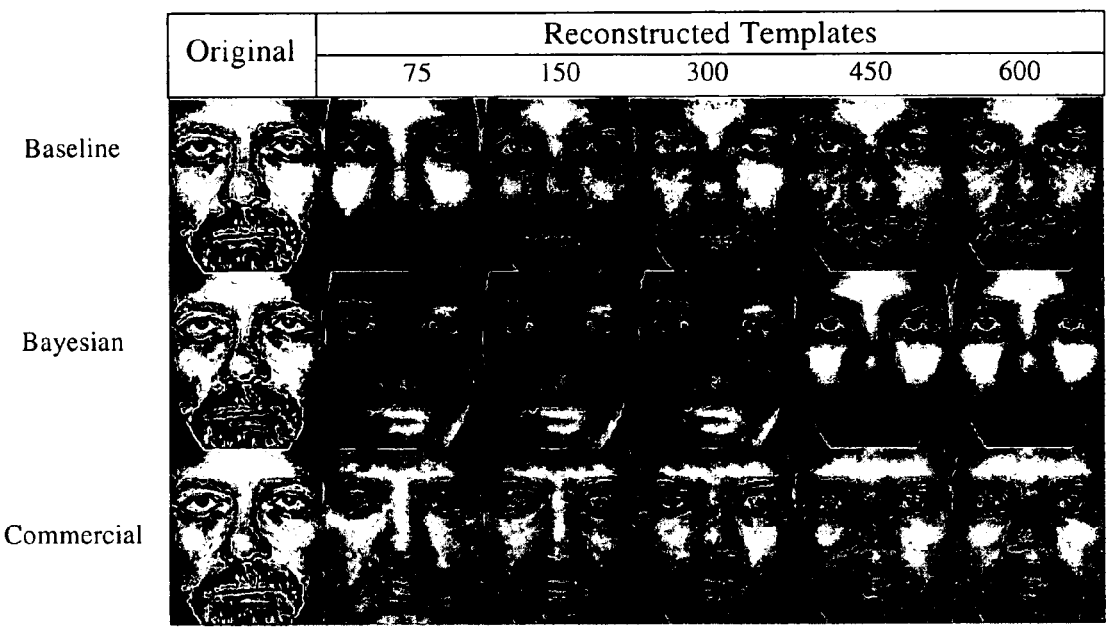
FIG. 12 is a series of reconstructed face templates for the three recognition algorithms using five different break-in sets with 75, 150, 300, 450, and 600 images. The first column represents the original template of the targeted subject. The first, second, and third rows represent the reconstructed templates for the baseline, Bayesian, and commercial algorithms, respectively.

To demonstrate the effect of the number of images in the break-in set on the quality of reconstructed templates and break-in performance, five different break-in sets from the FRGC training set were created. Two break-in sets contained 75 and 150 images with one image per subject and the other three break-in sets contained 300, 450, and 600 images with multiple images per subject. Sample images from the break-in set and gallery set are shown in FIG. 8. All 1,196 images were reconstructed in the FERET gallery set using each of the five break-in sets. FIG. 11 shows some of the reconstructed images using a break-in set with 600 images. FIG. 12 shows the reconstructed templates of a particular targeted subject with all five break-in sets. The reconstruction of the targeted subject's template improves with the number of images in the break-in set. The noise in the reconstructed images is caused by the break-in set and gallery set being from two distinct databases collected in different environments.

In the case of the Bayesian algorithm, the reconstructed images appear much smoother than the original image. As discussed earlier, the Bayesian algorithm requires more than 600 numbers of images in the break-in set for better reconstruction. To quantify the performance of breaking into a system with reconstructed images, the probability of break-in, which is defined as the probability of breaking a randomly chosen targeted subject, is computed by dividing the number of successfully verified target subject using reconstructed images by the total number of enrolled subjects.

Figure 13:
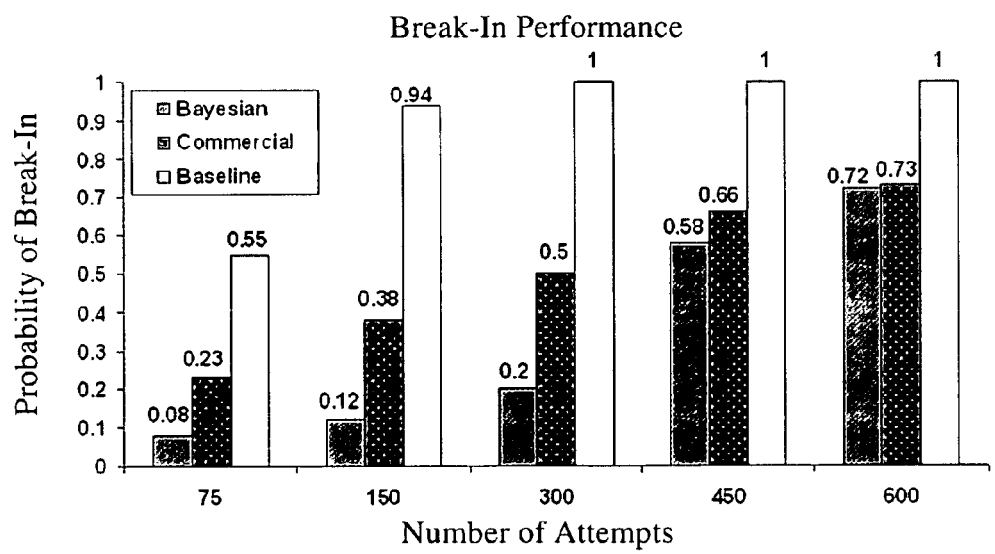
FIG. 13 is a bar graph showing the probability of break-in using five different break-in sets for the three recognition algorithms at a 1% false acceptance rate (FAR) on the Facial Recognition Technology (FERET) gallery set.

The reconstructed templates of the targeted subject are matched against the original templates of the targeted subject, and a dissimilarity matrix is generated for each of the three algorithms. From each of these dissimilarity matrices, the TAR at 1% FAR from the respective Receiver Operating Characteristic (ROC) curves is computed. The probability of breaking into any particular face recognition system is computed as the ratio between the number of accounts successfully broken at 1% FAR and the total number of accounts. This performance measure for break-in is different from that used in other related works, where the number of attempts is considered as a measure of the breaking into a security system. In this case, the number of attempts is fixed and is the same as the number of images in the break-in set. FIG. 13 compares the probabilities of break-in for the three algorithms with an increasing number of attempts. For the baseline algorithm, only 300 attempts are sufficient to achieve a 100% success rate to break into the system. For the feature-based commercial algorithm, 600 attempts are needed to break into the system for a 73% success rate. For the template-based Bayesian algorithm, 600 attempts are required to break into the system to achieve a 72% success rate. At 1% FAR, the probability of break-in with any random template after 600 attempts is 1%.

An FRS containing a commercial face recognition algorithm was used to compare the reconstruction method of the present invention with a hill climbing-based approach presented by Adler and Uludag and Jain. A. Adler, *Images Can Be Regenerated from Quantized Biometric Match Score Data*, Proc. Canadian Conf. Electrical and Computer Eng., pp. 469-472 (May 2004); U. Uldag and A. Jain, *Attacks on Biometric Systems: A Case Study in Fingerprints*, Proc. SPIE-EI 2004, Security, Steganography and Watermarking of Multimedia Contents, pp. 622-633 (January 2004). The eigenfaces required to modify the previous template in a hill climbing approach were created using 600 images from the break-in set. At each iteration, a randomly selected eigenface was added or subtracted from the previous template. Due to the computational demand of the hill climbing process, the hill climbing method was restricted to the first 100 subjects of the FERET gallery set and a maximum of 600 attempts were allowed per subject. The commercial algorithm was set to operate at 1% FAR with 99% TAR, and the system decided the acceptance or rejection of a probe template based on this operational setup. The number of targeted subjects that were successfully broken by the hill climbing method were counted and compared with the number of successfully accepted reconstructed templates using the break-in set with 600 images. Upon reconstruction of a targeted subject's face template, the reconstructed template was treated as an original face template and matched with the gallery set. This comparison shows the efficiency of the approach against the hill climbing approach after 600 iterations.

Figure 14:
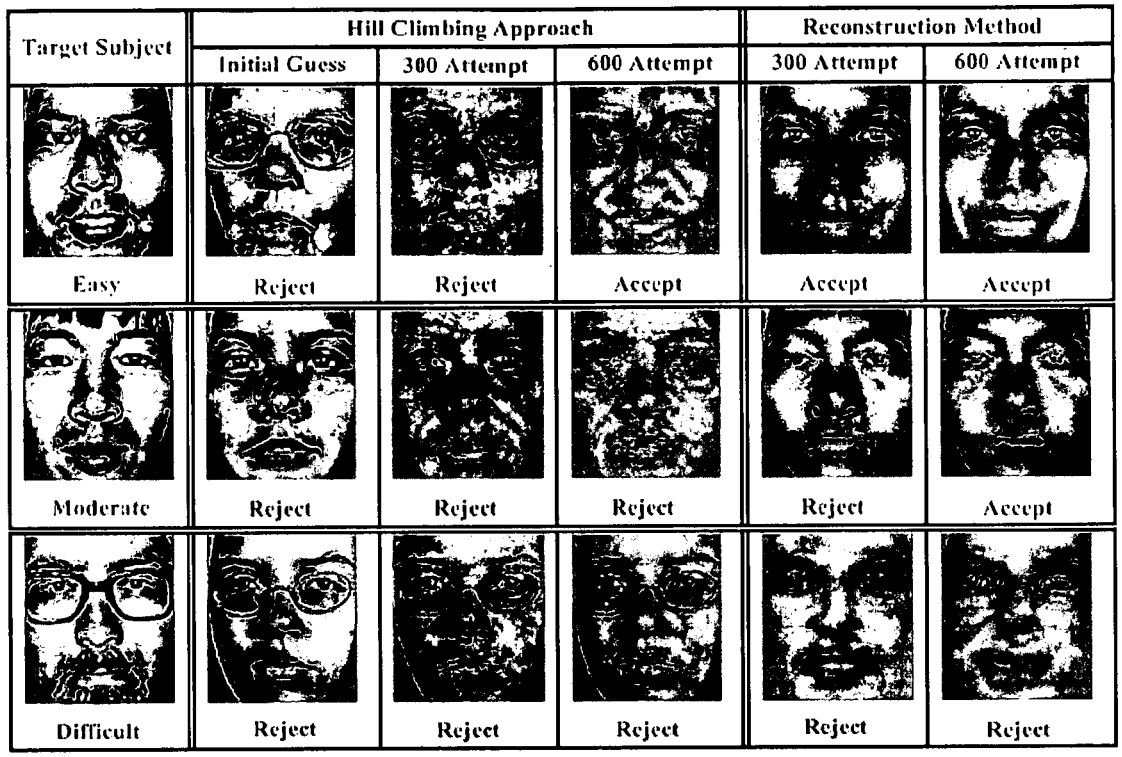
FIG. 14 is a table of images comparing reconstructed templates using the present method and reconstructed templates using the hill-climbing approach.

FIG. 14 presents reconstructed templates from the hill climbing approach at 300 and 600 iterations and the corresponding reconstructed templates from the reconstruction method of the present invention using the same number of comparisons. The first column shows three different targeted subjects enrolled with templates, marked as easy, moderate, and hard accounts to break in to. The first row represents a targeted subject (easy) whose account is broken by both the hill climbing approach and the reconstruction method. However, the hill climbing approach requires 600 attempts to break into this easy account, whereas the same result can be achieved with only 300 iterations using the reconstruction method. Similarly, the second row presents a targeted subject (moderate) whose account cannot be broken by the hill climbing approach after 600 attempts, but was broken by the reconstruction method in 600 attempts. Finally, the third row presents a targeted subject (hard) whose account cannot be hacked by either method.

Figure 15:
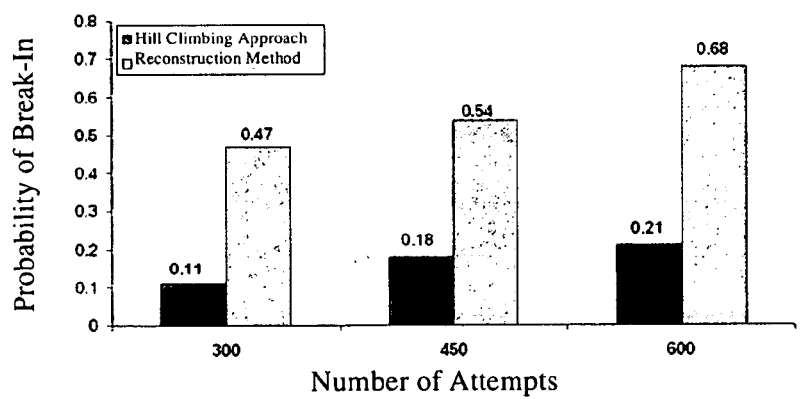
FIG. 15 is a bar graph comparing the probability of break-in at 1% FAR for the commercial algorithm with the first 100 subjects on the FERET gallery set. The commercial algorithm is set to operate at a predefined threshold such that TAR=99% at 1% FAR.

FIG. 15 compares the overall break-in performance of both methods using the first 100 subjects from the FERET gallery set. The probability of breaking into the system with any random template is equal to the FAR of the system, which is 0.01 in all experiments. The reconstruction method has a 47% higher chance of breaking into a random account compared to the hill climbing attack with 600 attempts. Adler shows that this particular hill climbing-based approach requires approximately 3,000 to 4,000 iterations to successfully break an account, which is much higher compared to the 600 iterations used here. *Images Can Be Regenerated from Quantized Biometric Match Score Data*, Proc. Canadian Conf. Electrical and Computer Eng., pp. 469-472 (May 2004). This count does not include the comparisons needed during the modeling procedure, which is done offline.

One countermeasure to the first-generation hill climbing attack is to quantize match scores. The systems with quantized match scores do not alter the output match scores with small changes in input images, which can prevent general hill climbing attacks. In such cases, if two similar probe templates, when matched with a template of the targeted subject, have the original match scores, say, 42.56 and 43.4, in the range [0, 100] and if the system quantizes the output match scores to the nearest integer, then both the scores will be quantized to 43. For such quantized scores, a hill climbing-based approach will fail to observe the improvement in the modified template and will fail to regenerate a template for the next iteration. However, such quantization of match scores has minimal effect on the reconstruction method.

The version of the hill climbing approach used here failed with quantized match scores and, therefore, the break-in performance of the hill climbing approach was not compared with the reconstruction method. The reconstruction method compares different face templates to the targeted subject and does not need to observe any improvement in the match scores; therefore, the reconstruction method does not have the limitation of the hill climbing approach and can be used on systems with quantized match scores.

Although a comparison could not be completed, the probability of break-in using quantized match scores for the commercial face recognition system was calculated. The quantization index, $Q_s$, that controls the level of quantization is given as: $$S_{quant} = \left\lfloor \frac{S_{orig} - S_{min}}{\Delta S} \right\rfloor \cdot \Delta S + S_{min}, Q_s = \frac{\Delta S}{(S_{max} - S_{min})},$$ ("Equation (18)")

where $S_{orig}$, $S_{quant}$, $S_{max}$, and $S_{min}$ represent the original, the quantized, the minimum, and the maximum match scores of a recognition system, respectively. $\Delta S$ controls the level of quantization of the original scores and is defined as the length of the quantized intervals, that is, the difference between two successive quantized scores. To be consistent with the variable range of match scores for different algorithms, quantization index $Q_s$ is defined by normalizing $\Delta S$ over a possible range of match scores of a recognition system. If the quantization index is set to 0.1, then the original scores are quantized at 10 different points, and if $Q_s$ equals to 0.01, then the original scores are quantized at 100 different points.

Figure 16:
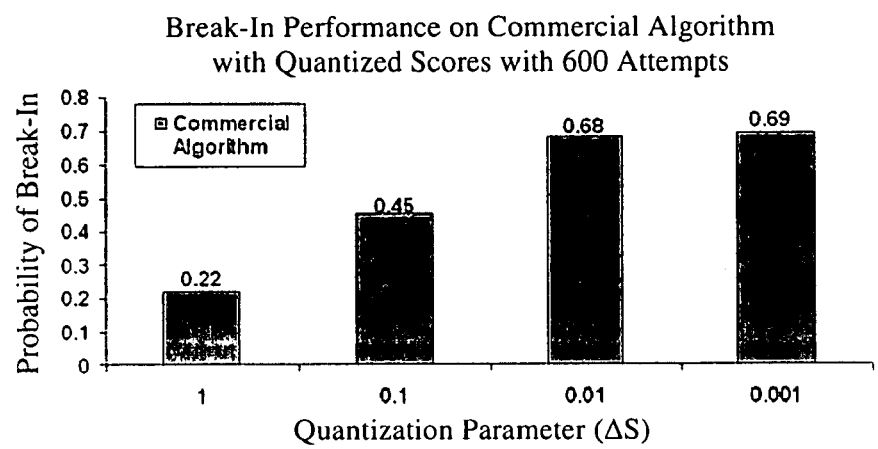
FIG. 16 is a bar graph showing the probability of break-in at 1% FAR for the commercial algorithm with quantized scores. The value of quantization parameter ΔS is set to 0.001, 0.01, 0.1, and 1 to quantize the original match score at four different levels.
Figure 17:
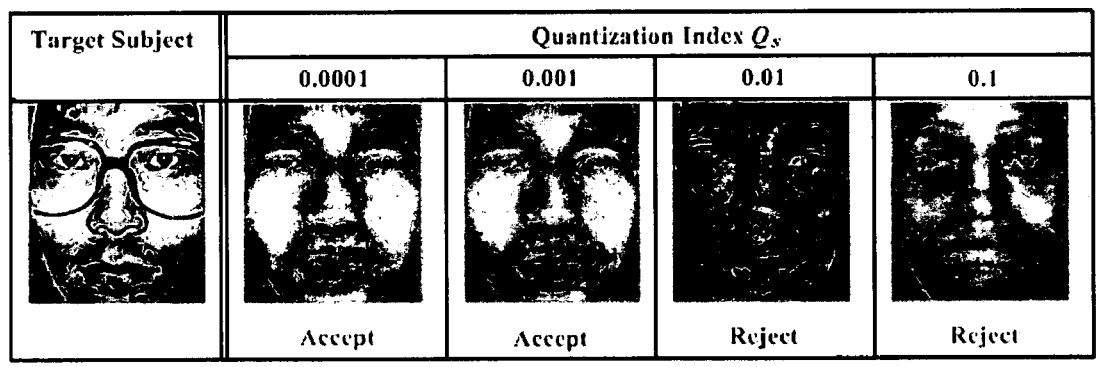
FIG. 17 is a table of images showing the effect of quantization of match scores on reconstructed templates.

Four different levels of quantization were used by setting the value of $Q_s$ to 0.0001, 0.001, 0.01, and 0.1. FIG. 16 shows the probability of break-in at 1% FAR for the commercial algorithm with the proposed quantization of match scores. The probabilities of break-in do not change significantly when the original scores quantized with $Q_s$ equals to 0.0001 or 0.001, and the probability of break-in drops from 0.68 to 0.45 when $Q_s$ equals to 0.01. However, for $Q_s$ equal to 0.1, the probability of break-in dropped from 0.45 to 0.22. FIG. 17 demonstrates the effect of quantization on a reconstructed template along with the acceptance/rejection decision from the system using that particular reconstructed template. With an increasing value of $Q_s$ the quality of the reconstructed template starts to degrade and will eventually be rejected by the system. If the system outputs a very high level of quantized scores, for example, with $Q_s$=0.1, then the original match scores are highly distorted, and the affine modeling of the underlying algorithm is erroneous, and as a result, the overall break-in performance is affected. However, such quantization of match scores has a trade-off with the operational flexibility of a system. For example, if the recognition system, with the range of original scores in the interval [0, 100], quantizes the original scores at 10 different points with $Q_s$ equal to 0.1, then the system is restricted to operate only at these 10 distinct operational points (thresholds) and lose the flexibility to operate at any intermediate threshold or FARs.

The reconstruction method of the present invention exposes a potential source for security breach in FRSs. An affine transformation is used to approximate the behavior of the face recognition system using an independent set of face templates termed as the break-in set. Selected subsets of templates in the break-in set are then matched only once with the enrolled templates of the targeted subject. Given the distances of the targeted subject's template, that template is embedded in the learned affine space and the modeling affine transformation is inverted to arrive at the original template.

Advantages of the reconstruction method include it is not based on a local search and it requires fewer attempts than hill-climbing-based approaches. In addition, the reconstruction method is difficult to detect automatically and cannot be neutralized by quantization of match scores, because it uses distinct templates in each break-in attempt.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall there between. Now that the invention has been described,

What is claimed is:

1. A method of reconstructing an unknown enrolled biometric target template of a recognition system, the method comprising:
   inputting a plurality of known biometric templates into the recognition system;
   calculating a match score for each of the plurality of known biometric templates and the unknown enrolled biometric target template of the recognition system;
   converting the match score for each of the plurality of known biometric templates into a plurality of dot product distances;
   determining a set of configuration points for the plurality of dot product distances that preserves the match score for each of the plurality of known biometric templates and the unknown enrolled biometric target template of the recognition system, wherein the set of configuration points comprises a set of vectors wherein a sum of the vectors in the set of vectors is equal to zero such that the center of the set of configuration points is at the origin;
   providing an affine transformation approximating the recognition system based upon the set of configuration points;
   identifying coordinates for each of the configuration points in the set of configuration points in the affine transformation;
   approximating coordinates for the unknown enrolled biometric target template in the affine transformation; and
   performing a pseudo-inversion of the affine transformation to reconstruct the unknown enrolled biometric target template.

2. The method of claim 1, wherein the plurality of known biometric templates are distinct and independent.

3. The method of claim 1, wherein determining a set of configuration points further comprising employing multidimensional scaling to determine the set of configuration points.

4. A method of reconstructing an unknown enrolled face image target template of a Face Recognition System, the method comprising inputting a plurality of known face image templates into the Face Recognition System;

calculating a match score for each of the plurality of known face image templates and the unknown enrolled face image target template of the Face Recognition System;

converting the match score for each of the plurality of known face image templates into a plurality of dot product distances;

determining a set of configuration points for the plurality of dot product distances that reserves the match score for each of the plurality of known face image templates and the unknown enrolled face image target template of the Face Recognition System, wherein the set of configuration points comprises a set of vectors wherein a sum of the vectors in the set of vectors is equal to zero such that the center of the set of configuration points is at the origin;

providing an affine transformation approximating the Face Recognition system based upon the set of configuration points;

identifying coordinates for each of the configuration points in the set of configuration points in the affine transformation;

approximating coordinates for the unknown enrolled face image target template in the affine transformation; and performing a pseudo-inversion of the affine transformation to reconstruct the unknown enrolled face image target template.

5. The method of claim 4, wherein determining a set of configuration points further comprising employing multidimensional scaling to determine the set of configuration points.

6. The method of claim 4, wherein the plurality of known face image templates are distinct and independent.

7. The method of claim 4, wherein the match scores are similarity match scores.

8. The method of claim 4, wherein the match scores are dissimilarity match scores.

9. The method of claim 4, wherein approximating coordinates for the unknown enrolled face image template further comprises embedding the unknown enrolled face image template into the affine transformation based on the match score for each of the plurality of known face image templates.

* * * * *